United States Patent [19]

Shinozaki et al.

[11] Patent Number: 5,168,350

[45] Date of Patent: Dec. 1, 1992

[54] SOLID-STATE COLOR IMAGING APPARATUS

[75] Inventors: Takashi Shinozaki; Hiroyuki Miyahara, both of Yokohama, Japan

[73] Assignee: Victor Company of Japan, Ltd., Yokohama, Japan

[21] Appl. No.: 599,900

[22] Filed: Oct. 19, 1990

[30] Foreign Application Priority Data

Oct. 24, 1989 [JP] Japan .................... 1-276713

[51] Int. Cl.$^5$ .................... H04N 9/07; H04N 9/04
[52] U.S. Cl. .................... 358/43; 358/50; 358/41
[58] Field of Search .................... 358/43, 41, 44, 50

[56] References Cited

U.S. PATENT DOCUMENTS

| | | | |
|---|---|---|---|
| 3,636,247 | 1/1972 | Takemura et al. | 358/43 |
| 3,652,786 | 3/1972 | Morishita | 358/50 |
| 3,739,079 | 6/1973 | Noda et al. | 358/55 |
| 4,107,732 | 8/1978 | Adcock et al. | 358/43 |
| 4,205,336 | 5/1980 | Nagumo | 358/43 |
| 4,213,145 | 7/1980 | Nagumo | 358/41 |
| 4,227,206 | 10/1980 | Nagumo | 358/44 |
| 4,238,765 | 12/1980 | Nagumo | 358/43 |

FOREIGN PATENT DOCUMENTS

| | | |
|---|---|---|
| 57-56270 | 11/1982 | Japan . |
| 60-25394 | 2/1985 | Japan . |
| 62-104294 | 5/1987 | Japan . |
| 62-43398 | 9/1987 | Japan . |
| 62-235889 | 10/1987 | Japan . |
| 2-46078 | 2/1990 | Japan . |
| 2-46084 | 2/1990 | Japan . |

*Primary Examiner*—James J. Groody
*Assistant Examiner*—Michael H. Lee
*Attorney, Agent, or Firm*—Pollock, VandeSande & Priddy

[57] ABSTRACT

A solid-state color imaging apparatus including first and second CDs for outputting electric signals in response to incident lights thereon and a prism for separating to green and red, blue lights a light incident thereon which includes optical information corresponding to an object viewed by the solid-state color imaging apparatus. In front of the first and second CCDs are provided first and second color filters whereby the separated green light is introduced through the first color filter into the first CCD and the separated red and blue light is introduced through the second color filter into the second CCD. The first color filter has light-transmission portions all of which transmit the green light from the prism, and the second color filter has red-light transmission portions and red-and-blue-light transmission portions which are successively arranged in horizontal and vertical directions so as to form a pattern comprising horizontal lines and vertical lines. The red-light transmission portions and the red-and-blue-light transmission portions of each of the horizontal lines are alternately arranged successively and the arranging orders thereof on one odd or even horizontal line and the next odd or even horizontal line are different from each other so as to provide a 180° phase difference.

2 Claims, 4 Drawing Sheets

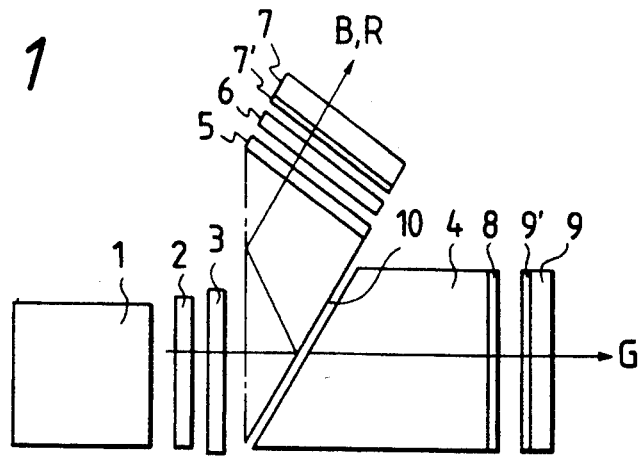

SOLID-STATE COLOR IMAGING APPARATUS

BACKGROUND OF THE INVENTION

The present invention relates to a solid-state color imaging apparatus equipped with image pickup devices such as CCDs (charge-coupled devices).

A conventional solid-state color imaging apparatus such as is being disclosed in Japanese Patent Publication No. 57-56270 or 62-43398 samples and picks up at every pixel input optical information, corresponding to an object viewed from the color imaging apparatus, through CCDs where a first CCD produces a green (G) image pickup output signal and a second CCD produces red (R) and blue (B) image pickup output signals so as to perform a predetermined pixel-shifting modulation. In the above-mentioned Japanese Patent Publication No. 57-56270, a color filter for the second CCD is constructed such that red filter components and blue filter components are arranged in correspondence with the respective pixels so as to form a checkered pattern and the first and second CCDs are arranged to be relatively shifted by a predetermined amount (for example, $\frac{1}{2}\mu_H$ where $\mu_H$ represents a pixel pitch in the horizontal directions) with respect to the object image and a phase difference between the read-out image-pickup signals of the first and second CCDs is arranged to be 180°, thereby line-sequentially obtaining the red and blue components to produce a color signal with 2H (H represents a horizontal scanning period). On the other hand, the solid-state color imaging apparatus disclosed in the above-mentioned Japanese Patent Publication No 62-43398 is constructed such that color signal filter components of color filters disposed in front of the first and second CCDs are alternately arranged in vertical directions with respect to the image pickup plane and the color signal components of both the color filters are different in arranging order from each other, thereby simultaneously re-producing three colors at every 1H.

Although satisfactory for increasing color resolution concurrently with reproducibility, of the above-described conventional solid-state color imaging apparatus, the former is disadvantageous for the vertical resolution of the luminance and color signals and the latter has a disadvantage in terms of oblique resolution of R/B. In addition, the color reproducibilities of both the color imaging apparatus are deteriorated as compared with a three-CCD type color imaging apparatus.

SUMMARY OF THE INVENTION

It is therefore an object of the present invention to provide a solid-state color imaging apparatus which is capable of realizing high resolution and high color reproducibility using an image pickup device with a small number of pixels.

In accordance with the present invention, there is provided a solid-state color imaging apparatus comprising: first and second image pickup means for outputting electric signals in response to incident lights thereon; first and second filter means disposed on surfaces of the first and second image pickup means; and separation means for separating to green and red, blue lights a light incident thereon which includes optical information corresponding to an object viewed by the solid-state color imaging apparatus, the separated green light being introduced through the first filter means into the first image pickup means and the separated red and blue lights being introduced through the second filter means into the second image pickup means, wherein the first filter means has light-transmission portions all of which transmit the green light from the separation means, and the second filter means has red-light transmission portions and red-and-blue-light transmission portions which are successively arranged in horizontal and vertical directions so as to form a pattern comprising horizontal lines and vertical lines, the red-light transmission portions and the red-and-blue-light transmission portions of each of the horizontal lines being alternately arranged, and the arranging orders thereof on one odd or even horizontal line and the next odd or even horizontal line being different from each other.

In accordance with the present invention, there is further provided a solid-state color imaging apparatus comprising: first and second image pickup means for outputting electric signals in response to incident lights thereon; first and second filter means disposed on surfaces of the first and second image pickup means; and separation means for separating to green and red, blue lights a light incident thereon which includes optical information corresponding to an object viewed by the solid-state color imaging apparatus, the separated green light being introduced through the first filter means into the first image pickup means and the separated red and blue lights being introduced through the second filter means into the second image pickup means, wherein the first filter means has light-transmission portions all of which transmit the green light from the separation means, and the second filter means has red-light transmission portions and red-and-blue-light transmission portions which are successively arranged in horizontal and vertical directions so as to form a pattern comprising horizontal lines and vertical lines, the red-light transmission portions and the red-and-blue-light transmission portions of each of the horizontal lines being alternately arranged, and the arranging orders thereof on the adjacent horizontal lines being different from each other.

BRIEF DESCRIPTION OF THE DRAWINGS

The present invention will be described in further detail with reference to the accompanying drawings, in which:

FIG. 1 is an illustration of an arrangement of a solid-state color imaging apparatus according to the present invention;

FIGS. 2A to 2C are illustrations of color filters used in the FIG. 1 imaging apparatus;

DETAILED DESCRIPTION OF THE INVENTION

Figure 3:
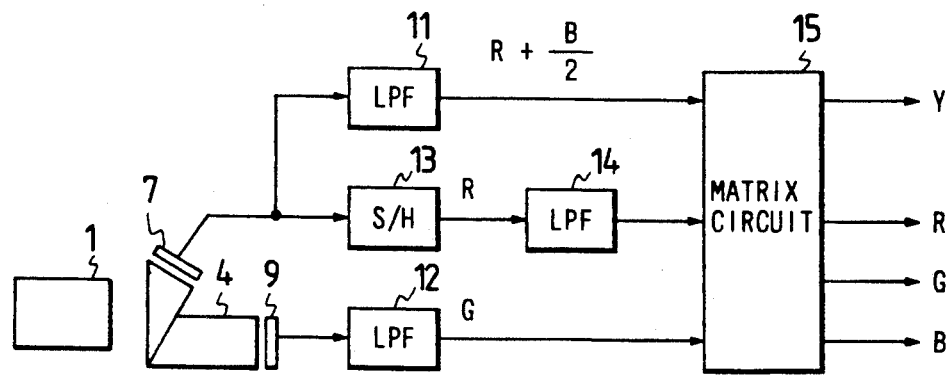
FIG. 3 is a block diagram showing an imaging system including the present invention.

A solid-state color imaging apparatus according to an embodiment of the present invention will be described hereinbelow with reference to the drawings. FIG. 1 shows a color separation arrangement using a prism. In FIG. 1, light from an object viewed by the solid-state color imaging apparatus is focused through a lens 1 and then reaches a prism 4 after passing through an optical low-pass filter 2 and a infrared-light cutting filter 3, thereby performing color separation to red, blue and green light. The separated red and blue light are introduced through a trimming filter 5, an optical low-pass filter 6 and a color filter 7' into a first CCD 7 which in turn performs the photoelectric conversion of the incident light. On the other hand, the separated green light is led through a trimming filter 8 and a color filter 9' to a second CCD 9 for photoelectric conversion. Numeral 10 represents a dichroic filter of the prism 4. The first and second CCDs 7 and 9 are arranged so that they are shifted by half a pixel pitch in the horizontal direction with respect to the incident image.

Figure 4:
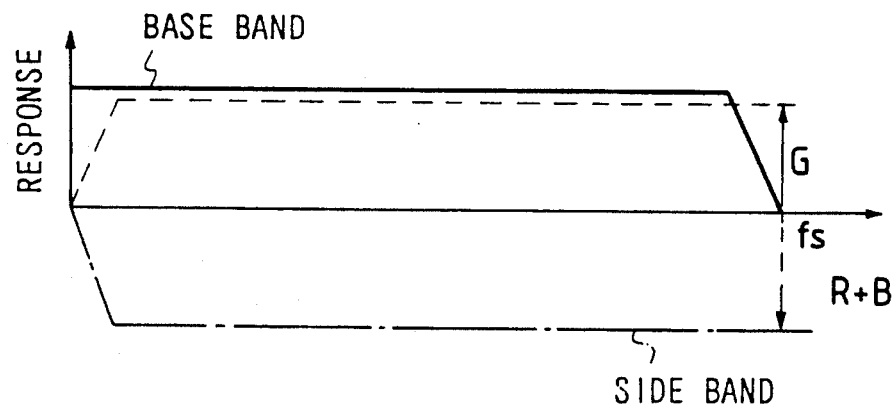
FIGS. 4 and 5 are graphic diagrams showing frequency spectrals of image pickup signals.
Figure 5:
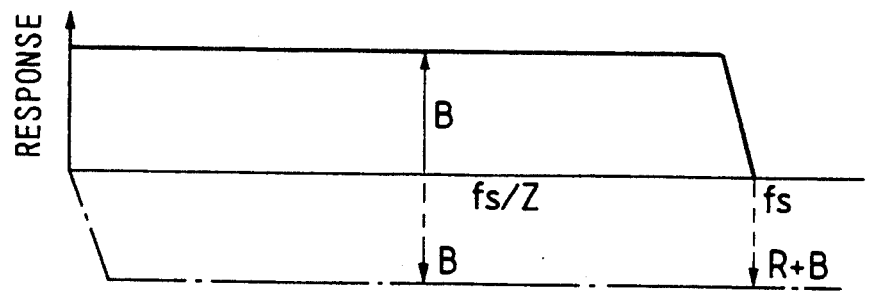
Figure 6:
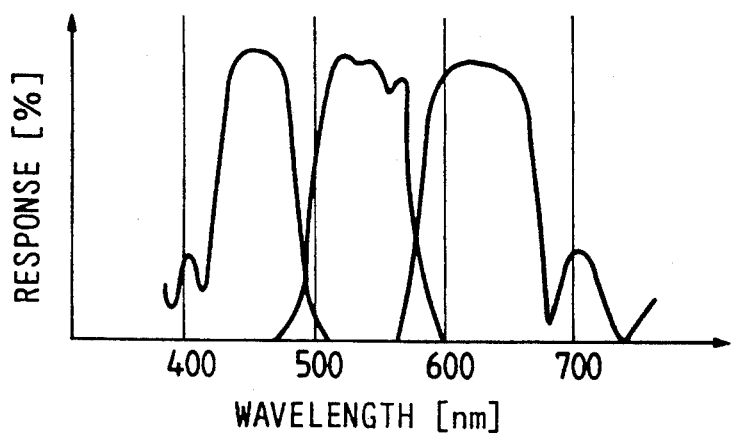
FIG. 6 to 8 are graphic illustrations for describing spectral characteristics.
Figure 7A:
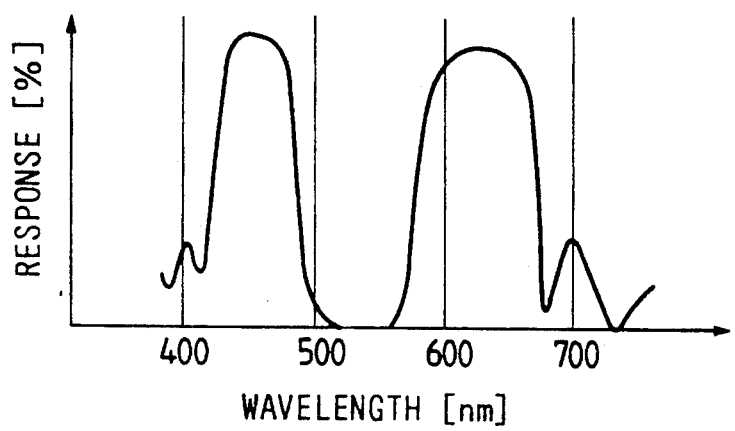
Figure 7B:
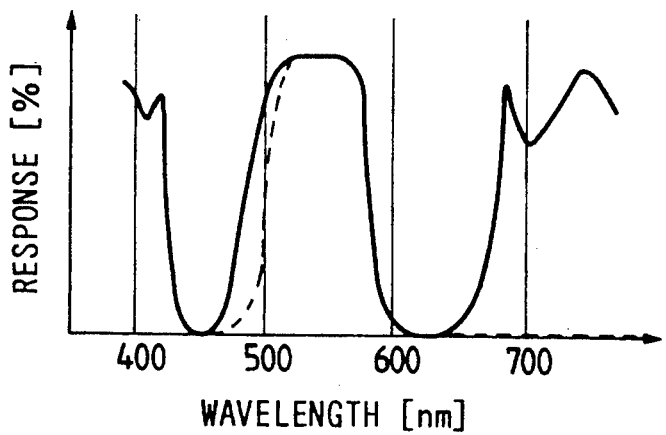

Here, after passing through the optical low-pass filter 2, the light is limited to bands as illustrated in FIGS. 4 and 5, and the red and blue light (directing to the first CCD 7) has a characteristic as illustrated in FIG. 7A by means of the dichroic filter 10 and the trimming filter 5. Although the green light (directing to the second CCD 9) has similarly a characteristic (solid line) as illustrated in FIG. 7B which is reverse to the characteristic due to the dichroic filter 10, for attaining a total characteristic as illustrated in FIG. 6, the green light characteristic is partially arranged as indicated by dotted lines in FIG. 7B by means of the trimming filter 8.

The CCDs for G (green) and R+B (red and blue) are spatially shifted by 1P/2 from each other as illustrated in FIGS. 2A to 2C whereby the spatial frequencies are the same and the phases are shifted by 180° from each other. Thus, if the G component and the R+B component are compared with each other under the condition of the same level, the higher harmonic components of the G and R+B are different by 180° in phase from each other (in the illustration, the upward direction represents the positive and the downward represents the negative). Accordingly, in the case of producing the luminance signal component (Y) (addition of both the outputs), the luminance band is converted into a wide band and at the same time the side band components can be cancelled, thereby permitting production of the luminance signal with less beat.

FIGS. 2(A) to (C) are illustrations for describing the color filters 7' and 9' disposed on the front surfaces of the first and second CCDs 7 and 9. For transmission of only the green light, the color filter 9' for the second CCD 9 has an arrangement as illustrated in FIG. 2A where green-light transmission portions are entirely arranged successively in horizontal and vertical directions. Character P designates one pixel pitch, and n, n' denote odd-number and even-number horizontal lines, respectively. On the other hand, because of being responsive to red and blue light, the first CCD 7 has an arrangement as illustrated in FIG. 2B. That is, red (R) and magenta (R+B) light transmission portions are alternately arranged on every horizontal line and the arranging orders or patterns thereof are different between the alternate horizontal lines when inter-raced scanning is adopted. In other words, the arranging orders are made so as to provide 180° phase difference between the odd or even horizontal lines. In the CCD for R+B, the spatial frequency of the Blue component becomes fs/2 and sampled, the phases of the blue on the adjacent scanning lines being different by 180° (the phase being arranged to be different by 180° at every scanning line). On the other hand, the spatial frequency of the R+B becomes fs, and in the case of deriving the R+B component, the fs/2 blue signal can be cancelled with two scanning lines so as not to insert it into the R+B component, thereby obtaining the R+B component with less beat component. Here, it is also appropriate to arrange the red (R) and magenta (R+B) light transmission portions as illustrated in FIG. 2C. That is, in this case, the arranging orders are different from each other at every horizontal line so as to provide a 180° phase difference when successive scanning is adopted.

Figure 8:
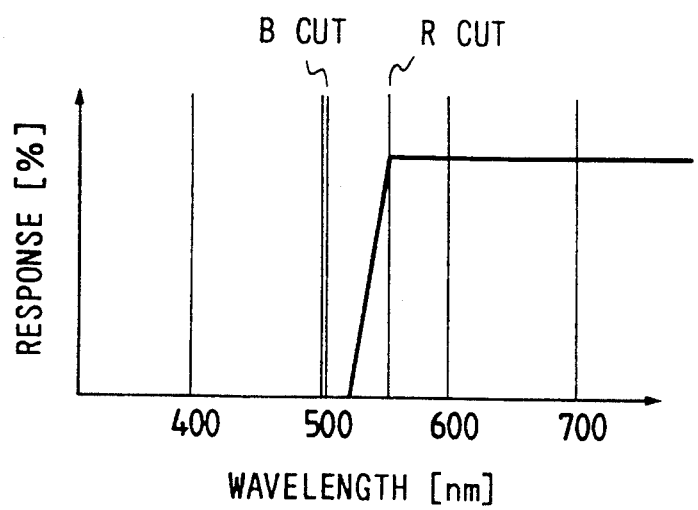

Each of the red-light transmission portions of the color filter 7' may be constructed as a yellow color filter to transmit only red light. More specifically, as illustrated in FIG. 8, preferable characteristics of the red-light transmission portions are that the transmittance for the red light with wavelengths from the longest wavelength to the first predetermined wavelength ("R cut") is 100% and the transmittance for the blue light with wavelengths from the shortest wavelength to the second predetermined wavelength ("B cut") is 0%. In this case, the green light is already rejected, thus it is unneccessary to define the transmittance for the green light with wavelengths from "R cut" to "B cut".

The output signals of the first and second CCDs 7 and 9 are supplied to low-pass filters (LPF) 11 and 12, respectively, so as to obtain a R+B/2 signal and a G signal. These signals are supplied to a matrix circuit 15. Further, the output signal of the first CCD 7 is supplied to a sample and hold circuit 13 so as to obtain an R signal which is in turn led through a low-pass filter (LPF) 14 to the matrix circuit 15. In response to the input signals, the matrix circuit 15 produces a wide-band luminance signal Y and narrow-band chroma signals R, G and B.

Figure 9:
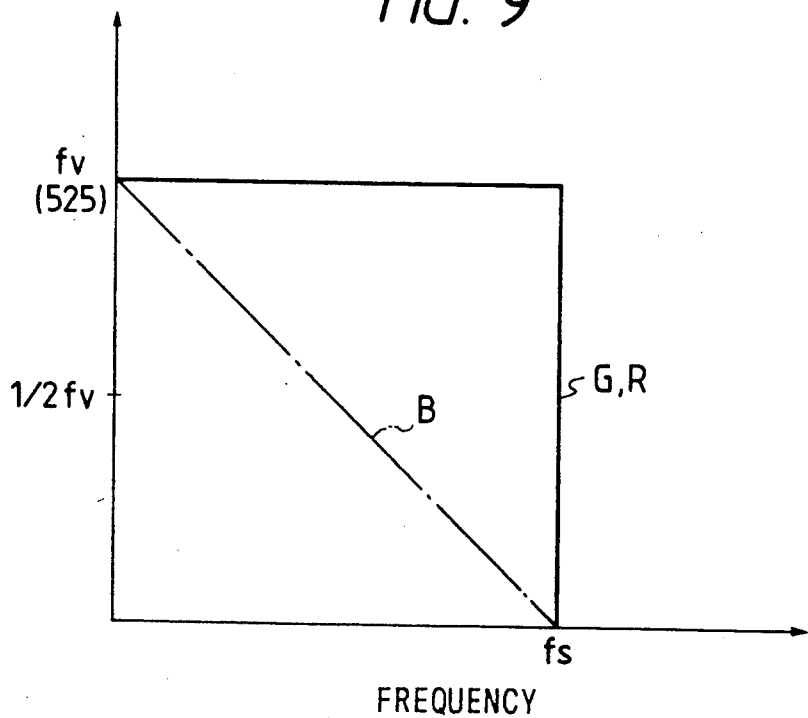
FIG. 9 is a graphic illustration of luminance resolutions of the present invention.

According to the present invention, it is possible to obtain a light utilization factor and color reproducibility whose value and degree are substantially equal to those in a three-CCD type color imaging apparatus. Moreover, as illustrated in FIG. 9, although the oblique resolution of B is lowered as compared with that of the three-CCD type color imaging apparatus, the horizontal and vertical resolutions become equal to those in the three-CCD type imaging apparatus. However, the affection of the lowering of the oblique resolution is little because the contribution of B to the luminance is as small as 10%.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A solid-state color imaging apparatus comprising:
   first and second image pickup means each having a plurality of pixels successively arranged vertically and horizontally with a pitch for outputting electric signals in response to incident light thereon, the pixel arrangements of said first and second image pickup means being shifted by ½ the pitch from each other in the horizontal direction;
   separation means for separating green and red, blue lights from a light incident thereon which includes optical information corresponding to an object viewed by said solid-state color imaging apparatus; and
   first and second filter means disposed on surfaces of said first and second image pickup means, said first filter means having light-transmission portions all of which transmit the green light from said separation means, and said second filter means having red-light transmission portions and red-and-blue-light transmission portions which are successively arranged in horizontal and vertical directions so as to form a pattern comprising horizontal lines and vertical lines, said red-light transmission portions and said red-and-blue-light transmission portions of each of said horizontal lines being alternately arranged, and the arranging orders thereof on one odd or even horizontal line and the next odd or even horizontal line being different from each other, the separated green light being introduced through said first filter means into said first image pickup means and the separated red and blue lights being introduced through said second filter means into said second image pickup means.

2. A solid-state color imaging apparatus comprising:

first and second image pickup means each having a plurality of pixels successively arranged vertically and horizontally with a pitch for outputting electric signals in response to incident lights thereon, the pixel arrangements of said first and second image pickup means being shifted by ½ of the pitch from each other in the horizontal direction;

separation means for separating to green and red, blue lights from a light incident thereon which includes optical information corresponding to an object viewed by said solid-state color imaging apparatus; and first and second filter means disposed on surfaces of said first and second image pickup means, said first filter means having light-transmission portions all of which transmit the green light from said separation means, and said second filter means having red-light transmission portions and red-and-blue-light transmission portions which are successively arranged in horizontal and vertical directions so as to form a pattern comprising horizontal lines and vertical lines, said red-light transmission portions and said red-and-blue-light transmission portions of each of said horizontal lines being alternately arranged, and the arranging orders thereof on the adjacent horizontal lines being different from each other, the separated green light being introduced through said first filter means into said first image pickup means and the separated red and blue lights being introduced through said second filter means into said second image pickup means.

* * * * *